US012081596B2

United States Patent
Atarius et al.

(10) Patent No.: US 12,081,596 B2
(45) Date of Patent: Sep. 3, 2024

(54) DETERMINING AN IP MULTIMEDIA SYSTEM (IMS) CAPABILITY

(71) Applicant: Lenovo (Singapore) Pte. Ltd., New Tech Park (SG)

(72) Inventors: Roozbeh Atarius, La Jolla, CA (US); Dimitrios Karampatsis, Ruislip (GB); Andreas Kunz, Ladenburg (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/019,029

(22) PCT Filed: Aug. 2, 2021

(86) PCT No.: PCT/IB2021/057067
§ 371 (c)(1),
(2) Date: Jan. 31, 2023

(87) PCT Pub. No.: WO2022/024101
PCT Pub. Date: Feb. 3, 2022

(65) Prior Publication Data
US 2023/0283645 A1 Sep. 7, 2023

Related U.S. Application Data

(60) Provisional application No. 63/059,816, filed on Jul. 31, 2020.

(51) Int. Cl.
*H04L 65/1016* (2022.01)
*H04L 65/1069* (2022.01)
(Continued)

(52) U.S. Cl.
CPC ...... *H04L 65/1016* (2013.01); *H04L 65/1069* (2013.01); *H04L 65/1104* (2022.05); *H04L 69/165* (2013.01)

(58) Field of Classification Search
CPC ............ H04L 65/1016; H04L 65/1104; H04L 65/1069; H04L 69/165
See application file for complete search history.

(56) References Cited

U.S. PATENT DOCUMENTS

| | | | |
|---|---|---|---|
| 2013/0242942 A1* | 9/2013 | Stille | H04L 65/1083 370/331 |
| 2015/0016446 A1 | 1/2015 | Scott | |

(Continued)

FOREIGN PATENT DOCUMENTS

| | | |
|---|---|---|
| CN | 112188570 A | 1/2021 |
| EP | 3780757 A1 | 8/2020 |
| WO | 2020030972 A1 | 2/2020 |

OTHER PUBLICATIONS

PCT/IB2021/057067, "Notification of Transmittal of the International Search Report and the Written Opinion of the International Searching Authority, or the Declaration", International Searching Authority, Oct. 20, 2021, pp. 1-18.

(Continued)

*Primary Examiner* — John A Follansbee
*Assistant Examiner* — Zonghua Du
(74) *Attorney, Agent, or Firm* — Kunzler Bean & Adamson

(57) ABSTRACT

Apparatuses, methods, and systems are disclosed for indicating the IMS capability for EPS fallback. One apparatus in a mobile communication network includes a processor and a transceiver that transmits to an IMS network entity a first SIP message comprising a request for establishing a data session, where the first SIP message contains a first contact header field. The transceiver receives a second SIP message from the IMS network entity for establishing the data session, where the second SIP message contains an indicator. The processor determines an IMS network capability from a (Continued)

combination of the first contact header field and the indicator.

18 Claims, 10 Drawing Sheets

(51) Int. Cl.
    *H04L 65/1104* (2022.01)
    *H04L 69/165* (2022.01)

(56) References Cited

U.S. PATENT DOCUMENTS

| | | | | |
|---|---|---|---|---|
| 2015/0078208 | A1* | 3/2015 | Bakker | H04L 63/0407 |
| | | | | 370/259 |
| 2019/0044980 | A1* | 2/2019 | Russell | H04W 12/06 |
| 2019/0149583 | A1* | 5/2019 | Jutila | H04L 65/1063 |
| | | | | 455/435.1 |
| 2019/0320351 | A1 | 10/2019 | Sahin et al. | |
| 2020/0015128 | A1* | 1/2020 | Stojanovski | H04W 36/0022 |
| 2021/0136644 | A1* | 5/2021 | Park | H04W 76/15 |
| 2022/0386183 | A1* | 12/2022 | Guo | H04W 36/0022 |

OTHER PUBLICATIONS

Motorola Mobility et al., "TCP use for EPS fallback when N26 is missing", 3GPP TSG-CT WG1 Meeting #112 C1-185195, Aug. 20-24, 2018, pp. 1-3.

Motorola Mobility et al., "TCP use for EPS fallback when N26 is missing", 3GPP TSG-CT WG1 Meeting #112 C1-185196, Aug. 20-24, 2018, pp. 1-2.

Rosenberg et al., "SIP: Session Initiation Protocol", The Internet Society, Network Working Group RFC 3261, Jun. 2002, pp. 1-269.

Rosenberg et al., "Reliability of Provisional Responses in the Session Initiation Protocol (SIP)", The Internet Society, Network Working Group RFC 3262, Jun. 2002, pp. 1-14.

Holmberg et al., "Mechanism to Indicate Support of Features and Capabilities in the Session Initiation Protocol (SIP)", IETF RFC 6809, Nov. 2012, pp. 1-19.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.6.0, Mar. 2020, pp. 1-436.

3GPP, "3rd Generation Partnership Project; Technical Specification Group Services and System Aspects; Procedures for the 5G System (5GS); Stage 2 (Release 16)", 3GPP TS 23.502 V16.5.1, Aug. 2020, pp. 1-594.

3GPP, "3rd Generation Partnership Project; Technical Specification Group Core Network and Terminals; IMS multimedia telephony communication service and supplementary services; Stage 3 (Release 16)", 3GPP TS 24.173 V16.2.0, Dec. 2019, pp. 1-36.

3GPP, "3rd Generation Partnership Project; Technical Specification Group Core Network and Terminals; IP multimedia call control protocol based on Session Initiation Protocol (SIP) and Session Description Protocol (SDP); Stage 3 (Release 16)", 3GPP TS 24.229 V16.5.0, Mar. 2020, pp. 1-1066.

3GPP, "3rd Generation Partnership Project; Technical Specification Group Core Network and Terminals; Non-Access-Stratum (NAS) protocol for 5G System (5GS); Stage 3; (Release 16)", 3GPP TS 24.501 V16.4.1, Mar. 2020, pp. 1-666.

3GPP, "3rd Generation Partnership Project; Technical Specification Group Core Network and Terminals; Policy and Charging Control over Rx reference point (Release 16)", 3GPP TS 29.214 V16.2.0, Mar. 2020, pp. 1-92.

3GPP, "3rd Generation Partnership Project; Technical Specification Group Core Network and Terminals; 5G System; Session Management Policy Control Service; Stage 3 (Release 16)", 3GPP TS 29.512 V16.4.0, Mar. 2020, pp. 1-186.

3GPP, "3rd Generation Partnership Project; Technical Specification Group Core Network and Terminals; 5G System; Policy Authorization Service; Stage 3 (Release 16)", 3GPP TS 29.514 V16.4.0, Mar. 2020, pp. 1-157.

3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

\* cited by examiner

DETERMINING AN IP MULTIMEDIA SYSTEM (IMS) CAPABILITY

CROSS-REFERENCE TO RELATED APPLICATIONS

This application claims priority to U.S. Provisional Patent Application No. 63/059,816 entitled "INDICATION OF THE IMS NETWORK CAPABILITY FOR EPS FALLBACK" and filed on Jul. 31, 2020 for Roozbeh Atarius, Dimitrios Karampatsis, and Andreas Kunz, which application is incorporated herein by reference.

FIELD

The subject matter disclosed herein relates generally to wireless communications and more particularly relates to indicating the IP Multimedia System ("IMS") capability for Evolved Packet System ("EPS") fallback.

BACKGROUND

Certain wireless networks support interworking with an Evolved Packet System ("EPS"). According to current Third Generation Partnership Project ("3GPP") standards, if a Fifth Generation System ("5GS") network supports interworking with EPS without any N26 reference point (i.e., an inter-CN interface between the Mobility Management Entity ("MME") in the EPS core network ("CN") and the Access and Mobility Management Function ("AMF") in the 5G CN ("5GC")), in order to avoid loss of the session establishment for the multimedia telephony ("MMTEL") service, the User Equipment ("UE") at the time of IMS registrations requests the network to use Transmission Control Protocol ("TCP") as the transport protocol for the Session Initiation Protocol ("SIP") signaling for the MM ILL session establishment. Use TCP of requires a dedicated connection and may comprise some limitations if there is a network address translation ("NAT") between the UE and the proxy-call session control function ("P-CSCF") in the IMS network.

BRIEF SUMMARY

Disclosed are procedures for indicating the IMS capability for EPS fallback. Said procedures may be implemented by apparatus, systems, methods, or computer program products.

One method of a User Equipment device ("UE") includes transmitting a first session initiation protocol ("SIP") message to a network entity comprising a request for establishing a data session, where the first SIP message contains a first contact header field. The first method includes receiving a second SIP message from the network entity for establishing the data session, where the second SIP message contains an indicator. The first method includes determining an IP Multimedia Protocol ("IMS") network capability from a combination of the first contact header field and the indicator.

One method of an IMS entity includes receiving a first SIP message to a UE comprising a request for establishing a data session, where the first SIP message contains a first contact header field. The second method includes transmitting a second SIP message to the UE for establishing the data session, where the second SIP message contains the first contact header field and an indicator. Here, the second SIP message indicates an IMS network capability using a combination of the first contact header field and the indicator.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
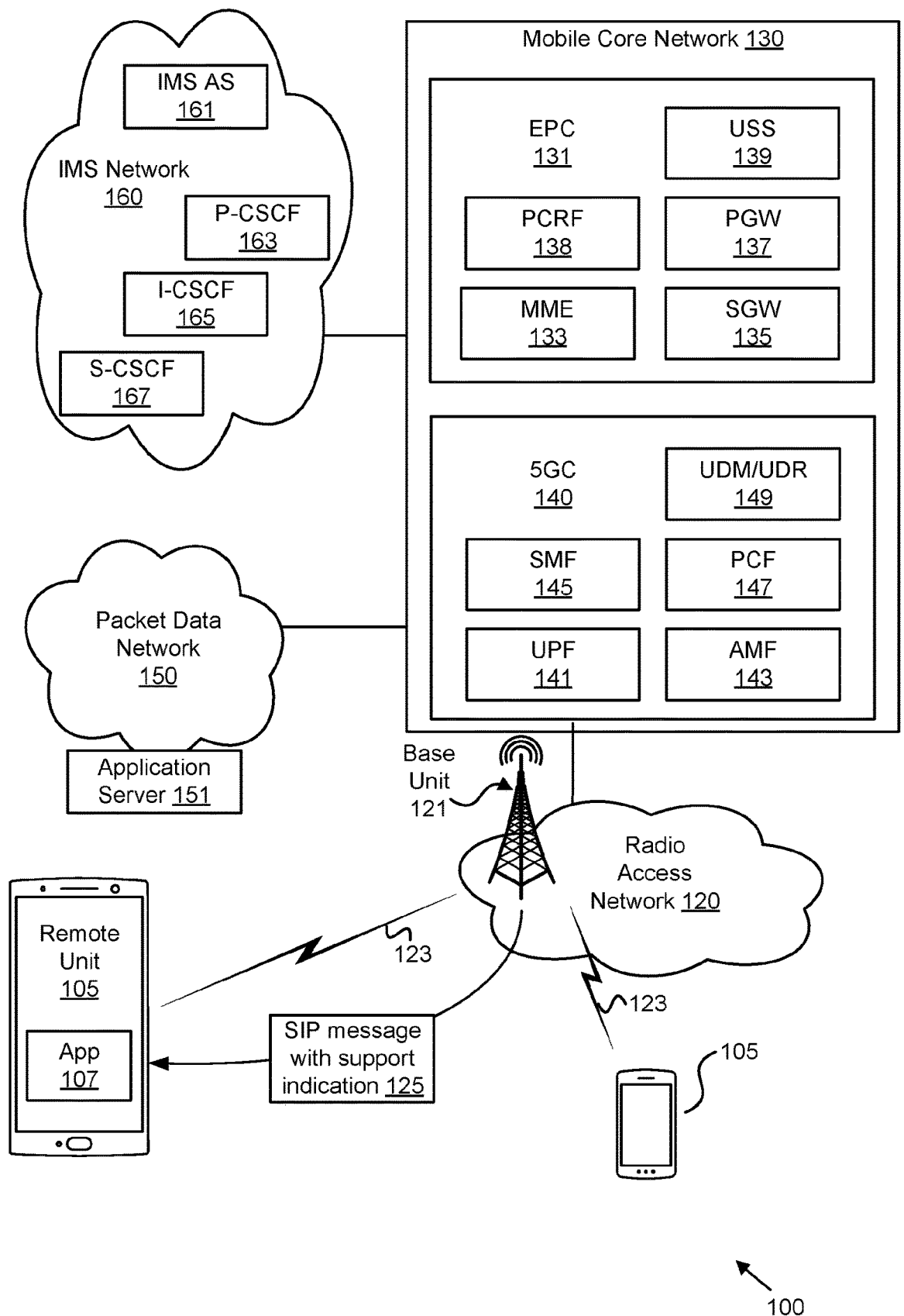
FIG. 1 is a schematic block diagram illustrating one embodiment of a wireless communication system for non-homogeneous coverage of a network slice within a registration area.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In to the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for how acknowledgements for indicating the IP Multimedia System ("IMS") capability for Evolved Packet System ("EPS") fallback. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions. The disclosed techniques are for an IMS network which is capable of maintaining the multimedia telephony ("MMTEL") session establishment without any loss of Session Initiation Protocol ("SIP") signaling to indicate to the User Equipment ("UE") of this capability and thereby the UE uses transport protocol due to other factors such as congestion control or avoiding of fragmentation than the supports of interworking between 5GS and EPS without any N26 reference point.

Disclosed are procedures for how the IMS network informs a UE about support for the EPS fallback. Therefore, the UE does not have to use the TCP transport protocol for the MMTEL service, in order to avoid loss of SIP signaling at the time of EPS fallback, when the 5G network supports the interworking with the EPS without any N26 reference point.

FIG. 1 depicts a wireless communication system 100 for improved suspension of a data connection, according to embodiments of the disclosure. In one embodiment, the wireless communication system 100 includes at least one remote unit 105, a radio access network ("RAN") 120, a mobile core network 130, and an IMS network 160. The RAN 120 and the mobile core network 130 form a mobile communication network. The RAN 120 may be composed of a base unit 121 with which the remote unit 105 communicates using wireless communication links 123. Even though a specific number of remote units 105, base units 121, wireless communication links 123, RANs 120, mobile core networks 130, and IMS network 160 are depicted in FIG. 1, one of skill in the art will recognize that any number of remote units 105, base units 121, wireless communication links 123, RANs 120, mobile core networks 130, and IMS network 160 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 130. As described in greater detail below, the base unit(s) 121 may provide a cell operating using a first carrier frequency and/or a cell operating using a second frequency. Cells using the first carrier frequency may form a first frequency layer, while cells using the second carrier frequency may form a second frequency layer.

In some embodiments, the remote units 105 communicate with an application server 151 via a network connection with the mobile core network 130. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server 151 in the packet data network 150 using the PDU session. The PDU session represents a logical connection between the remote unit 105 and a User Plane Function ("UPF") 141 in the 5GC 140.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 150. The remote unit 105 may establish additional PDU sessions for communicating with other data networks (such as the IMS network 160) and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an to EPS Bearer, i.e., a tunnel between the remote unit 105 and a Packet Gateway ("PGW") 137 in the EPC 131. In certain embodiments, there is a one-to-one mapping between an EPS Bearer and a QoS profile, such that all packets belonging to a specific EPS Bearer have the same QoS Class Identifier ("QCI").

In some embodiments, the remote units 105 access services in the IMS network 160 via a network connection with the mobile core network 130. For example, an application 107 in a remote unit may trigger establishment of a session with the IMS network 160 via the mobile core network 130 and the RAN 120. The mobile core network 130 then relays traffic between the remote unit 105 and the IMS network 150 using the PDU session.

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In various embodiments, the mobile core network 130 may include an evolved packet core ("EPC") 131 and a 5G core ("5GC") 140, which may be coupled to a data network, like the Internet and private data networks, among other data networks. As depicted, the mobile core network 140 is also coupled to an IMS network 160. A remote unit 105 may have a subscription or other account with the mobile core network 130. In various embodiments, each mobile core network 130 belongs to a single mobile network operator ("MNO"). The present disclosure is not intended to be limited to the implementation of any particular wireless communication system architecture or protocol.

The depicted EPC 131 includes various network entities, including the MME 133, the SGW 135, the PGW 137, the PCRF 138, and the USS 139. The EPC 131 may include additional entities as understood in the art. Although specific numbers and types of core network entities and network functions are depicted in FIG. 1, one of skill in the art will recognize that any number and type of core network entities and/or network functions may be included in the EPC 131.

The depicted 5GC 140 includes several network functions ("NFs"). As depicted, the 5GC 140 includes at least one UPF 141. The 5GC 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM"") and a User Data Repository ("UDR"). Although specific numbers and types of network functions are depicted in FIG. 1, one of skill in the art will recognize that any number and type of network functions may be included in the 5GC 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the 5GC 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile communication network 130 may include an authentication, authorization, and accounting ("AAA") server.

Note that the 5G network functions perform similar functions to the entities in the EPC 131. For example, the AMF 143 may be mapped to an MME 133, the SMF 145 may be mapped to a control plane portion of a PGW 137 (i.e., PGW-C) and/or to an MME 133, the UPF 141 may be mapped to an SGW 135 and a user plane portion of the PGW 137 (i.e., PGW-U), the PCF 147 may be mapped to the PCRF 138, the UDM/UDR 149 may be mapped to the HSS 139, etc.

In various embodiments, the 5GC 140 supports different types of mobile data connections and different types of network slices, wherein each mobile data connection utilizes a specific network slice. Here, a "network slice" refers to a portion of the 5GC 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 to for ease of illustration, but their support is assumed.

While FIG. 1 depicts components of a EPC and a 5GC, the described embodiments for signaling an IMS capability for fallback support apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the term "RAN node" is used for the base station but it is replaceable by any other radio access node, e.g., gNB, ng-eNB, eNB, Base Station ("BS"), Access Point ("AP"), etc. Further, the operations are described mainly in the context of 5G NR. However, the below described solutions/methods are also equally applicable to other mobile communication systems improved suspension of a data connection.

As discussed above, the remote units 105 may communicate with the IMS network 160 via a data path that passes through the mobile core network 130. For example, the mobile core network 130 may relay IMS signaling and/or media traffic between the remote unit 105 and the IMS application server 161 using the data path. In some embodiments, the remote unit 105 may connect to the IMS network 160 via the 5G core network 140. In certain embodiments, the remote unit 105 may connect to (e.g., fallback to) the EPC 131 in order to access services in the IMS network 160.

The IMS network 160 is a network for providing IP-based multimedia services, for example to the remote unit 105. As depicted, the IMS network 160 includes an IMS application server ("AS") 161. Here, the IMS AS 161 hosts and/or executes multimedia services, such as IMS MMTEL. In certain embodiments, the IMS AS 161 is a SIP application server. As depicted, the IMS network 160 may also include a plurality of call session control functions ("CSCF"), including the proxy-CSCF ("P-CSCF") 163, the interrogating-CSCF ("I-CSCF") 165, and serving-CSCF ("S-CSCF") 167. The CSCFs 163-167 may be SIP functions providing control plane services for the IMS network 160.

As noted above, a remote unit 105 connected to the 5GC 140 may be unable to access the IMS network 160 for MMTEL service (e.g., due to lack of N26 interface in the mobile core network 130 connecting the AMF 141 to the MME 133), thus requiring fallback to the EPC 131. However, the EPS fallback introduces extra delay to IMS MM ILL session setup which can result in loss on IMS signaling (and thus even more delay).

To prevent the loss of IMS signaling, the remote unit 105 may rely on transmission control protocol ("TCP") rather than user datagram protocol ("UDP") for guaranteed delivery of the SIP signaling. Unlike UDP, which is connection-less protocol such that the sender may transmit the data packets towards the receiver with no order, the TCP is a connection-based protocol where the sender and the receiver may set up a connection a priori to transmission and reception of the data packets to guarantee the reception of the sent data packets. The data packets may be received in the order they have been transmitted. Although TCP offers reliability, it may come at the cost of higher transmission time, header overhead which may be 2.5 times of that of UDP, mandatory acknowledgment on the recipient side, and handshaking of sender and recipient. Accordingly, the below described solutions address the case where the IMS network supports EPS fallback without relying on TCP.

Where the 5GS network supports the EPS fallback without N26 reference point, the UE registers to the internet protocol multimedia subsystem ("IMS") network by establishing a new binding with the transport set to TCP for the MMTEL session establishment. This may be due to the time needed in case the EPS fallback from NR occurs at the time of MMTEL session establishment since the N26 reference does not exist. TCP transport may prevent the SIP signaling getting lost during the MMTEL session establishment. The new binding with TCP transport for the MMTEL session establishment may be done by adding the address-of-record in the contact header field of the SIP REGISTER request and adding IMS communication service identifier ("ICSI") for the MMTEL, e.g., encoded as the URN urn:urn-7:3gpp-service.ims.icsi.mmtel and added as a tag-value within the media feature tag g.3gpp.icsi-ref with TCP as transport protocol, see 3GPP TS 24.229. Therefore, the Contact header field of the SIP REGISTER request may be as follows:

Contact: <sip:alice@pc33.atlanta.com>; g.3gpp.icsi-ref="urn:urn-7:3gpp-service.ims.icsi.mmtel"; transport=tcp Once the IMS has authenticated the UE, it may send the binding for the address-of-record in the Contact header field of the SIP 200OK response, to indicate that this binding has been registered for the address-of-record. An "expires" parameter indicating how long the UE has the binding to be valid, may also be in the contact header field. The IMS network may also include all other registered bindings that have been registered for this address-of-record. The Contact header field of the SIP 200 OK response may be as follows:

Contact: <sip:alice@pc33.atlanta.com>; g.3gpp.icsi-ref="urn:urn-7:3gpp-service.ims.icsi.mmtel"; transport=tcp
Expires=3600

Figure 2A:
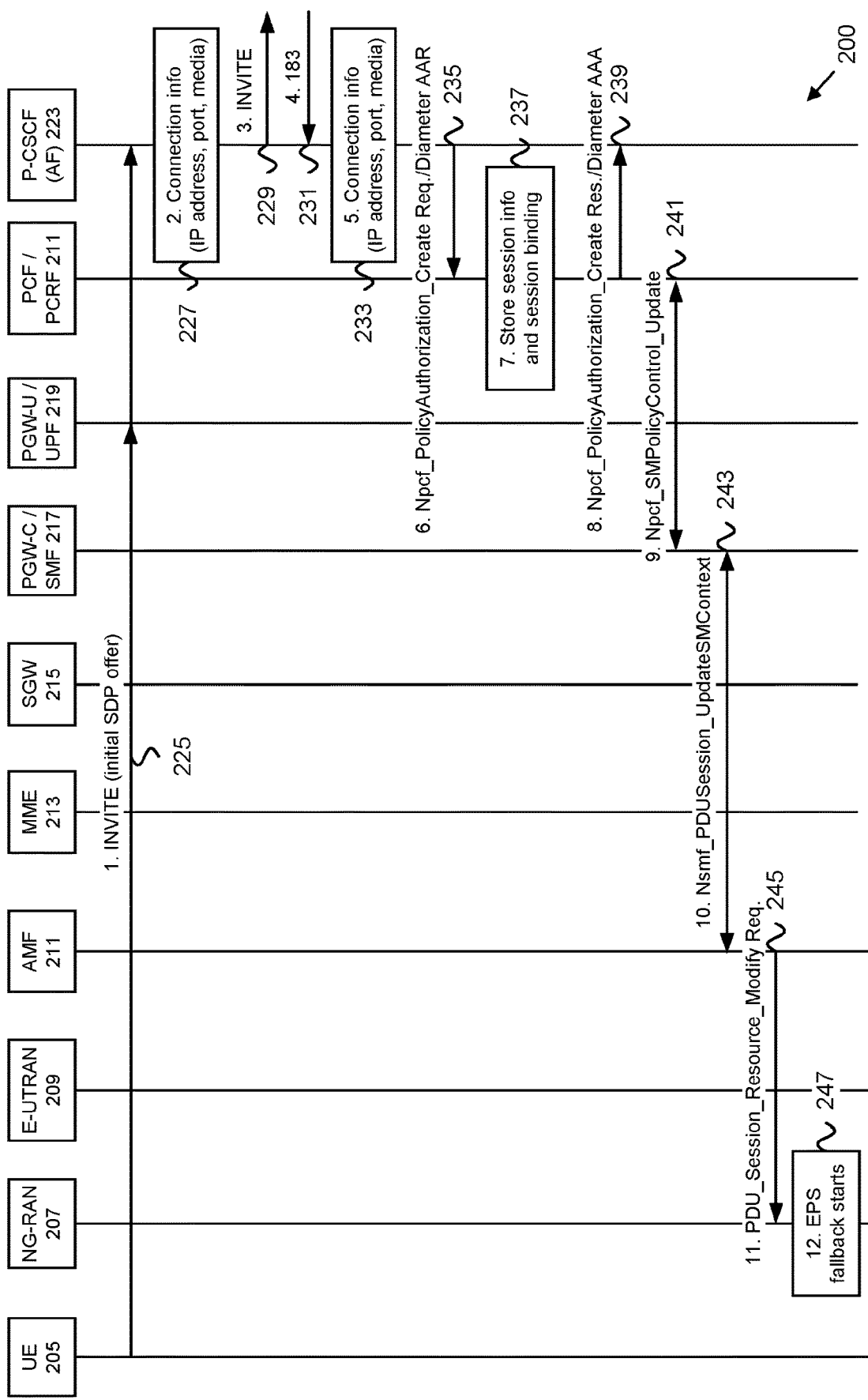
FIG. 2A depicts a diagram illustrating one embodiment of EPS fallback with TCP as transport protocol for MMTEL session establishment.
Figure 2B:
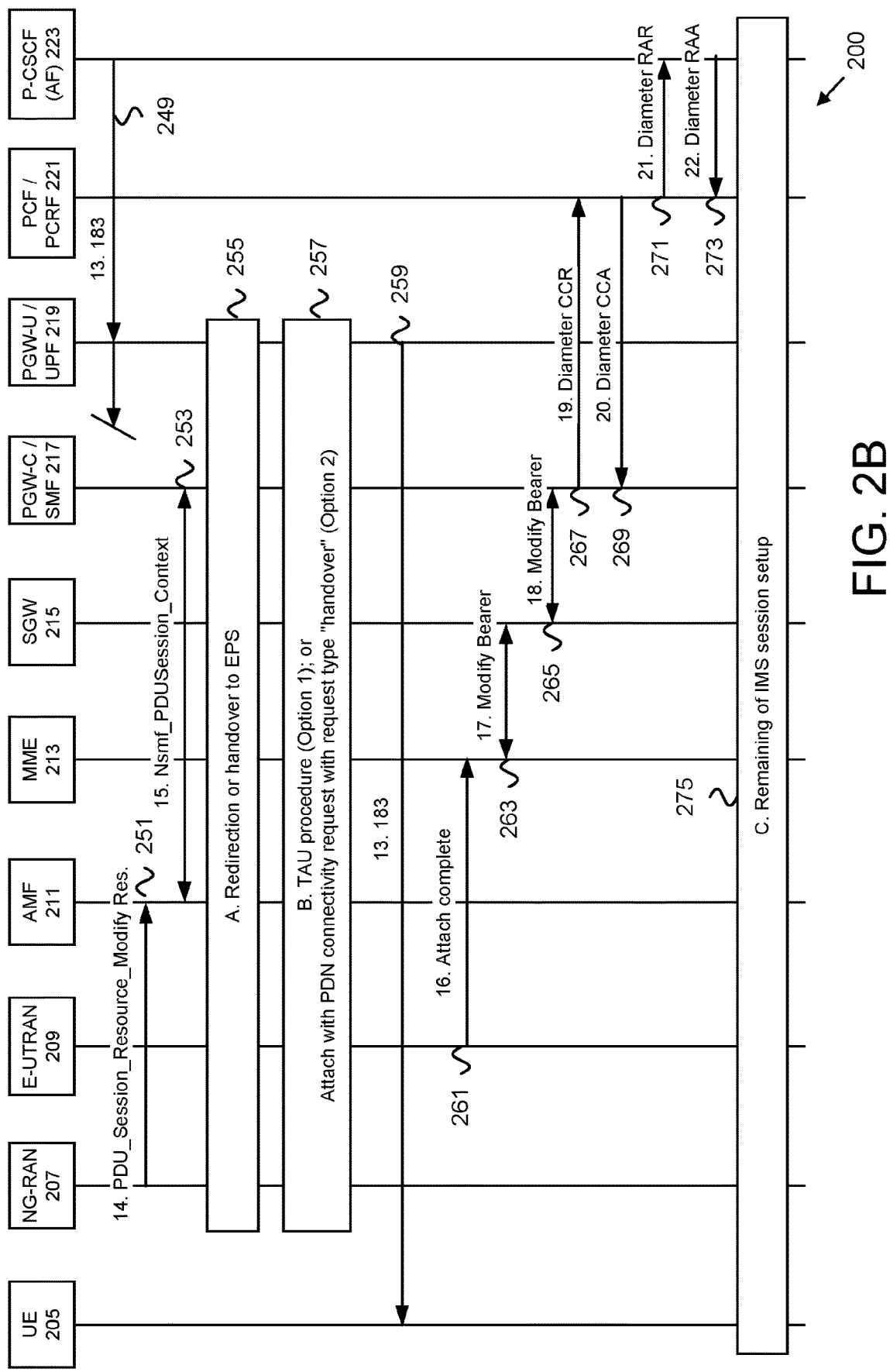
FIG. 2B is a continuation of the procedure of FIG. 2A.

FIGS. 2A-2B depicts a procedure 200 for EPS fallback with TCP as transport protocol for MMTEL session establishment. The procedure 200 involves a UE 205, a NG-RAN 207, a E-UTRAN 209, an AMF 211, an MME 213, a SGW 215, a PGW-C/SMF 217, a PGW-U/UPF 219, a PCF/PCRF 221, and a P-CSCF (AF) 223. As a precondition, it is assumed that the UE 205 is registered as described above to the IMS network and an EPS fallback from NR occurs at the time of resource allocation.

At Step 1, the UE 205 transmits the SIP INVITE message containing SDP offer to establish an IMS session to the P-CSCF (AF) 223 (see messaging 225).

At Step 2, the P-CSCF (AF) 223 gets the connection information, such as IP address and port (see block 227).

At Step 3, the P-CSCF (AF) 223 forwards the SIP INVITE message request towards the remote UE (see messaging 229).

At Step 4, the P-CSCF (AF) 223 receives a "183 SIP Session Progress" response from the remote UE (see messaging 231).

At Step 5, the P-CSCF (AF) 223 gets the connection information, such as IP address and port (see block 233).

At Step 6, the P-CSCF (AF) 223 sends the session information to the PCF/PCRF 221 (see messaging 235).

At Step 7, the PCF/PCRF 221 stores the session information and performs session binding by associating data flows with applicable PCC rules to an existing PDU session (see block 237). The PCF/PCRF 221 creates the session context for the application.

At Step 8, the PCF/PCRF 221 sends the confirmation to the P-CSCF (AF) 223 (see messaging 239).

At Step 9, the PCF/PCRF 221 sends Npcf_SMPolicyControl_UpdateNotify request to provide the PGW-C/SMF 217 with the updated session management related policy for the PDU session, e.g., according to 3GPP TS 29.512 (see messaging 241).

At Step 10, the PGW-C/SMF 217 invokes service operation to the AMF 211 to transmit N2 SM information to the NG-RAN node 207 (see messaging 243). For example, the PGW-C/SMF 217 may send a Namf_Communication_N1N2MessageTransfer message with parameters: SM Context ID, N2 SM information (PDU Session ID, N3 tunnel information, QFI(s), QoS Profile(s), Session-AMBR. Due to the IMS message exchange between the UE 205 and the 3GPP network (e.g., 5GS), the UE 205 is in CM-CONNECTED state and the AMF 211 has established N2 transport association with the NG-RAN node 207 and therefore no Paging procedure is needed.

At Step 11, the AMF 211 transmits the N2 SM information received from the PGW-C/SMF 217 to the NG-RAN node 207 (see messaging 245). For example, the AMF 211 may use the PDU_Session_Resource_Modify Request, according to 3GPP TS 38.40, and send an N2 interface message containing a PDU Session request.

At Step 12, the NG-RAN node 207 rejects the new QoS flow for the PDU session establishment request from the PGW-C/SMF 217 (see block 247). The NG-RAN rejection may be based on configuration in to use the E-UTRAN 209 for that PDU session, and thus to use inter-RAT mobility. Thus, the EPS fallback starts.

Continuing on FIG. 2B, at Step 13, the P-CSCF (AF) 223 forwards the SDP response within the "SIP 183 Session Progress" message upon receiving the confirmation from the PCF/PCRF 221 in step 8, towards the UE 205 via the PGW-U/UPF 219 (see messaging 249). Note that without special action the "SIP 183 Session Progress" message may get lost due to EPS fallback triggered by the NG-RAN node 207 rejecting the new QoS flow for the PDU session establishment request.

At Step 14, the NG-RAN node 207 sends a QoS flow rejection indication to the AMF 211 for the PGW-C/SMF 217 (see messaging 251). The QoS flow rejection indication may be included in the N2 SM information container which is included in N2 message (N2 Session response message). The NG-RAN node 207 may also provide a reason for the rejected QoS flow establishment (e.g., non-supported 5QI and/or inter-system change needed). The NG-RAN node 207 may send an indication to the AMF 211 in the N2 Session response message or in a separate N2 message (e.g. a N2 request for AN resource release) that Inter-System Redirection is required and/or request for establishment of QoS Flow for IMS voice failed. The AMF 211 is then to release the existing N1 connection with the UE 205 in order to initiate re-direction to the E-UTRAN 209 (see clause 4.2.6 in 3GPP TS 23.502).

At Step 15, the AMF 211 forwards the N2 SM information container to the PGW-C/SMF 217 with the reason for the rejection (see messaging 253). The AMF 211 performs a handover procedure (e.g., as described in subclause 4.11.1.2.1 of 3GPP TS 23.502) if a N26 interface is deployed or RRC release with redirection (e.g., as described in subclauses 4.2.6 and 4.11.1.3.2 of 3GPP TS 23.502) if the N26 interface is not deployed. Here, it is assumed that the N26 interface is not deployed, therefore handover is not performed and an RRC release message with redirection is sent.

Upon receipt of message 14 by the NG-RAN 207, the NG-RAN 207 initiates either handover if the N26 interface exists (not applicable in the depicted embodiment), or release of access network via inter-system redirection to EPS if the N26 interface does not exist (see block 255). In both cases it is assumed that the UE 205 is a dual mode UE with functionality for both 5GS and EPS. The PGW-C/SMF 217 reports change of the RAT type to PCF/PCRF 221 if these changes are subscribed by PCF/PCRF 221 (e.g., as specified in clause 4.11.1.2.1, or clause 4.11.1.3.2.6). When the UE 205 is connected to EPS, either Option 1 or Option 2 (described below) is executed (see block 257).

Option 1: In the case of 5GS to EPS handover (see subclause 4.11.1.2.1 of 3GPP TS 23.502) and in the case of inter-system redirection to EPS with N26 interface (see subclause 4.11.1.3.2 of 3GPP TS 23.502). In either case the UE 205 initiates TAU procedure. Here, it is assumed that the N26 interface is not deployed, therefore Option 1 is not performed.

Option 2: In the case of inter-system redirection to EPS without N26 interface (see subclause 4.11.2.2 of 3GPP TS 23.502). If the UE 205 supports Request Type flag "handover" for PDN connectivity request during the attach procedure (e.g., as described in subclause 5.3.2.1 of 3GPP TS 23.401) and the UE 205 has received the indication that interworking without N26 is supported, then the UE 205 initiates Attach with PDN connectivity request with request type "handover". Here, it is assumed that the N26 interface is not deployed, therefore Option 2 is performed.

At Step 16, at this point the UE 205 and the mobile network (i.e., EPS) have a connection via the E-UTRAN 209. Since TCP is used as the transport protocol, the SIP 183 Session Progress request (i.e., received by PGW-U/UPF 219 in step 13) is transmitted towards the UE 205 (see messaging 259). After completion of the mobility procedure to EPS or the 5GS to EPS handover procedure, the E-UTRAN 209 sends the Attach Complete message to the MME 213 (see messaging 261).

At Step 17, upon receipt of the Attach Complete message, the MME 213 sends the modify bearer request to the SGW 215 (see messaging 263).

At Step 18, the SGW 215 sends a modify bearer request to the PGW-C/SMF 217 (see messaging 265).

At Step 19, the PGW-C/SMF 217 re-initiates the setup of the dedicated bearer(s) for the maintained PCC rule(s) and mapping the 5G QoS parameters to EPC QoS parameters (see Diameter Credit-Control Request ("CCR") 267). The PGW-C/SMF 217 reports about successful resource allocation to PCF/PCRF 221. If subscribed by PCF/PCRF 221, the PGW-C/SMF 217 also reports access network information.

At Step 20, the PCF/PCRF 221 acknowledges (see Diameter Credit-Control Answer ("CCA") 269).

At Step 21, the PCF/PCRF 221 reports about successful resource allocation to P-CSCF (AF) 223 (see Diameter Re-Authorization Request (RAR) message 271). If subscribed by the P-CSCF (AF) 223, the PCF/PCRF 221 also reports the access network information, for example, the access type change (e.g., as specified in 3GPP TS 29.514) and/or the IP-CAN type change (e.g., as specified in 3GPP TS 29.214).

At Step 22, the P-CSCF (AF) 223 acknowledges (see Diameter Re-Authorization Answer ("RAA") 273). At this point the P-CSCF (AF) 223 that has subscribed to the access network information knows that network access is gained back again with a change from the NG-RAN 207 to the E-U IRAN 209.

The UE 205 and the IMS network then proceed with the remaining of the IMS session establishment procedure (see block 275).

Figure 3A:
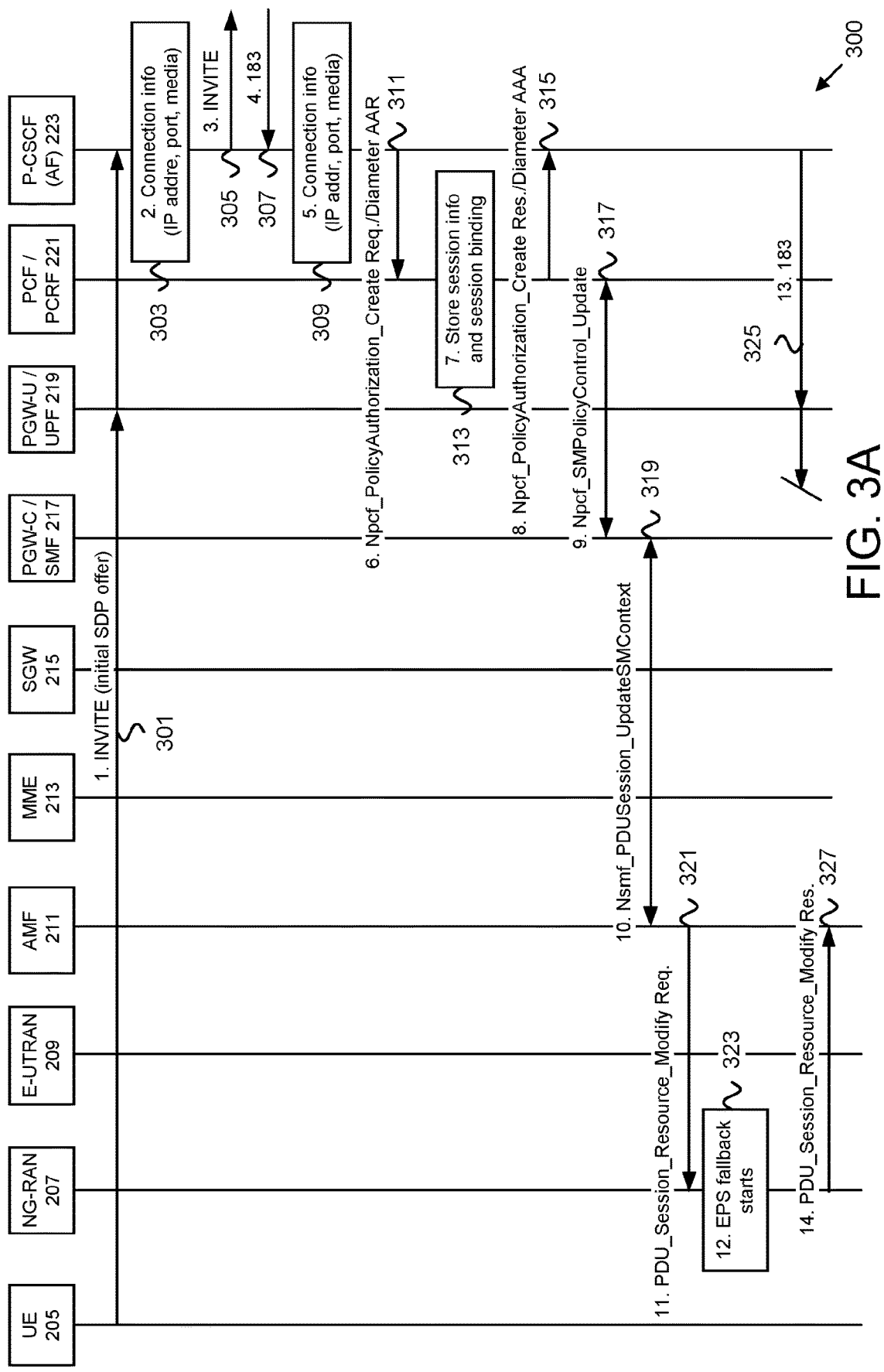
FIG. 3A depicts a diagram illustrating one embodiment of EPS fallback for MMTEL session establishment.
Figure 3B:
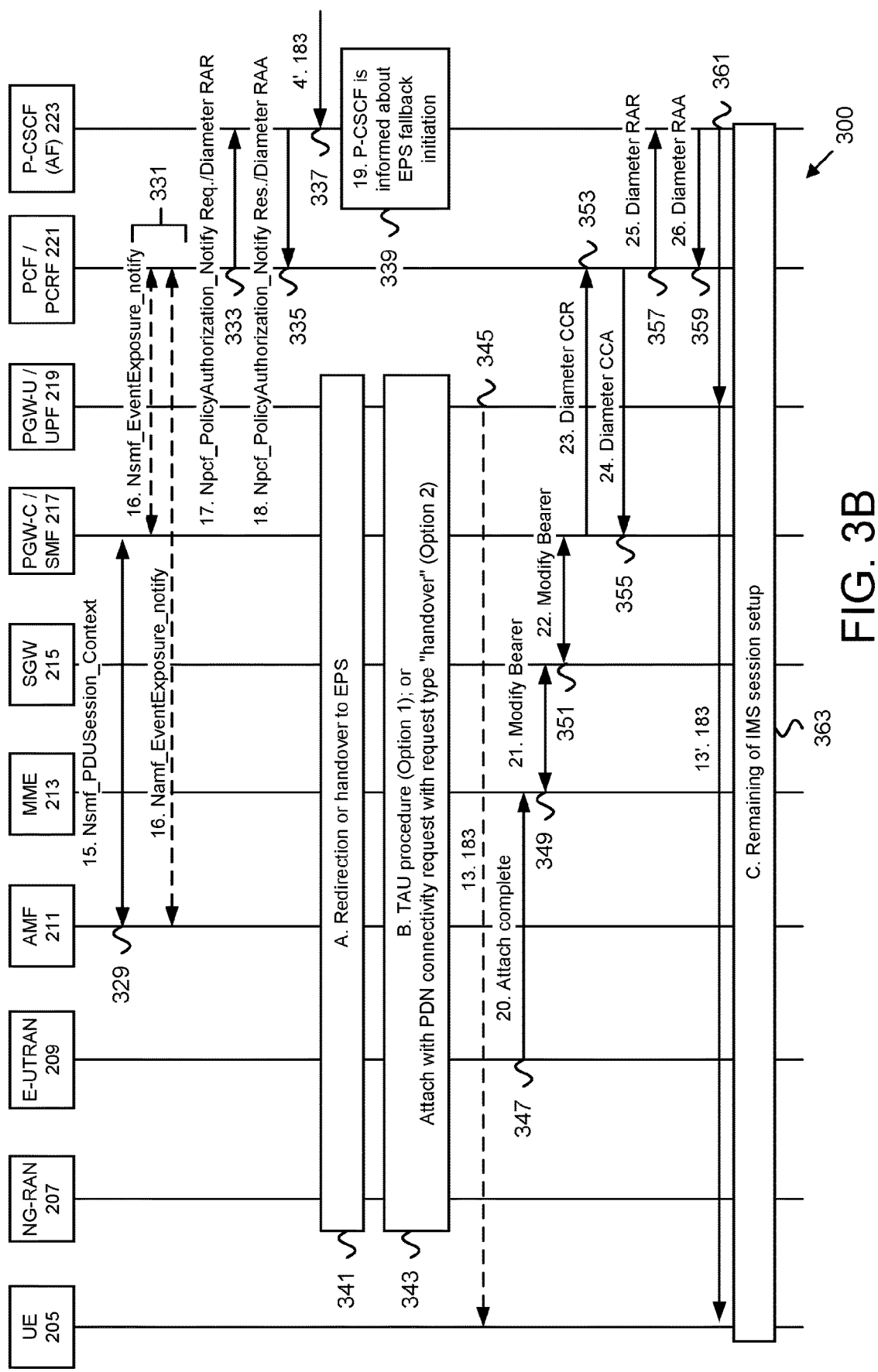
FIG. 3B is a continuation of the procedure of FIG. 3A.

FIGS. 3A-3B depict a procedure 300 for EPS fallback for MMTEL session establishment. The procedure 300 involves a UE 205, a NG-RAN 207, a E-UTRAN 209, an AMF 211, an MME 213, a SGW 215, a PGW-C/SMF 217, a PGW-U/UPF 219, a PCF/PCRF 221, and a P-CSCF (AF) 223. In the case where the IMS network supports service fallback to EPS, the P-CSCF (AF) 223 may subscribe to the EPS fallback event (e.g., as specified in 3GPP TS 29.514 and 3GPP TS 29.214). When the P-CSCF (AF) 223 subscribes to the EPS fallback, the P-CSCF (AF) 223 may receive a notification that the EPS fallback has initiated. The P-CSCF (AF) 223 then knows the access network may be disconnected and the UE 205 may not have any access to the network. Therefore, the P-CSCF (AF) 223 avoids forwarding any SIP message which is targeted to the UE 205 until the EPS fallback is completed and the UE 205 again has access to the IMS network (i.e., for E-UTRAN 209 and the EPS).

According to IETF RFC 3262, the reliable provisional responses such as SIP 183 Session Progress may be retransmitted that starts at T1 seconds and doubles for each retransmission. T1 is an estimate of the round-trip time ("RTT"), and it defaults to 500 ms, see IETF RFC 3261. The matching PRACK should be received within 64×T1 seconds of the retransmission of the SIP 183 Session Progress, otherwise the original request should be rejected, see IETF RFC 3262. The MMTEL session establishment may therefore be according to FIGS. 3A-3B.

At Step 1, the UE 205 transmits the SIP INVITE message containing SDP offer to establish an IMS session to the P-CSCF (AF) 223 (see messaging 301).

At Step 2, the P-CSCF (AF) 223 gets the connection information, such as IP address and port (see block 303).

At Step 3, the P-CSCF (AF) 223 forwards the SIP INVITE message request towards a remote UE (see messaging 305).

At Step 4, the P-CSCF (AF) 223 receives a "183 SIP Session Progress" response from the remote UE (see messaging 307).

At Step 5, the P-CSCF (AF) 223 gets the connection information, such as IP address and port (see block 309).

At Step 6, the P-CSCF (AF) 223 sends the session information to the PCF/PCRF 221 (see messaging 311).

At Step 7, the PCF/PCRF 221 stores the session information and performs session binding by associating data flows with applicable PCC rules to an existing PDU session (see block 313). The PCF/PCRF 221 creates the session context for the application.

At Step 8, the PCF/PCRF 221 sends the confirmation to the P-CSCF (AF) 223 (see messaging 315).

At Step 9, the PCF/PCRF 221 sends Npcf_SMPolicyControl_UpdateNotify request to provide the PGW-C/SMF 217 with the updated session management related policy for the PDU session, e.g., according to 3GPP TS 29.512 (see messaging 317).

At Step 10, the PGW-C/SMF 217 invokes service operation to the AMF 211 to transmit N2 SM information to the NG-RAN node 207 (see messaging 319). For example, the PGW-C/SMF 217 may send a Namf_Communication_N1N2MessageTransfer message with parameters: SM Context ID, N2 SM information (PDU Session ID, N3 tunnel information, QFI(s), QoS Profile(s), Session-AMBR. Due to the IMS message exchange between the UE 205 and the 3GPP network (e.g., 5GS), the UE 205 is in CM-CONNECTED state and the AMF 211 has established N2 transport association with the NG-RAN node 207 and therefore no Paging procedure is needed.

At Step 11, the AMF 211 transmits the N2 SM information received from the PGW-C/SMF 217 to the NG-RAN node 207 (see messaging 321). For example, the AMF 211 may use the PDU_Session_Resource_Modify Request, e.g., according to 3GPP TS 38.40, to send an N2 interface message containing a PDU Session request.

At Step 12, if the NG-RAN node 207 rejects the new QoS flow for the PDU session establishment request from the PGW-C/SMF 217 (see block 323). The NG-RAN rejection may be based on configuration in to use E-UTRAN 209 for that PDU session, and thus to use inter-RAT mobility. Thus, the EPS fallback starts.

At Step 13, the P-CSCF (AF) 223 forwards the SDP response within the "SIP 183 Session Progress" message upon receiving the confirmation from the PCF/PCRF 221 in step 8, towards the UE 205 via the PGW-U/UPF 219 (see messaging 325). The SIP 183 Session Progress may get lost due to EPS fallback triggered by the NG-RAN node 207 rejecting the new QoS flow for the PDU session establishment request.

At Step 14, the NG-RAN node 207 sends a QoS flow rejection indication to the AMF 211 for the PGW-C/SMF 217 (see messaging 327). The QoS flow rejection indication may be included in the N2 SM information container which is included in N2 message (N2 Session response message). The NG-RAN node 207 may also provide a reason for the rejected QoS flow establishment (e.g., non-supported 5QI and/or inter-system change needed). The NG-RAN node 207 may send an indication to the AMF 211 in the N2 Session response message or in a separate N2 message (e.g. a N2 request for AN resource release) that Inter-System Redirection is required and/or request for establishment of QoS Flow for IMS voice failed. The AMF 211 is then to release the existing N1 connection with the UE 205 in order to initiate re-direction to the E-UTRAN 209 (see clause 4.2.6 in 3GPP TS 23.502).

Continuing on FIG. 4B at Step 15, the AMF 211 forwards the N2 SM information container to the PGW-C/SMF 217 with the reason for the rejection (see messaging 329). The AMF 211 performs a handover procedure (e.g., as described in subclause 4.11.1.2.1 of 3GPP TS 23.502) if a N26 interface is deployed or RRC release with redirection (e.g., as described in subclauses 4.2.6 and 4.11.1.3.2 of 3GPP TS 23.502) if the N26 interface is not deployed. Here, it is assumed that the N26 interface is not deployed, therefore handover is not performed and an RRC release message with redirection is sent.

At Step 16, because the PCF/PCRF 221 has subscribed to the event of the EPS fallback at the PGW-C/SMF 217, the PGW-C/SMF 217 informs the PCF/PCRF 221 the loss of access network information, e.g., as specified in 3GPP TS 29.514 and 3GPP TS 29.214 (see messaging 331). Alternately, if the PCF/PCRF 221 can subscribes to the EPS fallback event at the AMF, then the PCF/PCRF 221 may be informed by the AMF 211 upon receipt rejection from the NG-RAN node 207 for QoS flow establishment that the inter-RAT redirection is ongoing (see messaging 331).

At Step 17, because the P-CSCF (AF) 223 has subscribed to the event of the EPS fallback at the PCF/PCRF 221 (e.g., as specified in 3GPP TS 29.514 and 3GPP TS 29.214), the PCF/PCRF 221 informs the P-CSCF (AF) 223 about the EPS fallback has initiated (see Diameter Re-Authorization Request ("RAR" 333).

At Step 18, the P-CSCF (AF) 223 acknowledges (see Diameter Re-Authorization Answer ("RAA") 335).

At Step 19, the P-CSCF (AF) 223 at this point knows that the EPS fallback has started and therefore the UE 205 does not have any access connection to the network. It should therefore be assumed if the P-CSCF (AF) 223 receives a retransmitted SIP 183 Session Progress request in message 4' (see messaging 337), then the P-CSCF (AF) 223 shall not forward the SIP 183 Session Progress request until the P-CSCF (AF) 223 is notified that the access network is established (see block 339). The retransmission of SIP 183 Session Progress may occur after a default value of 500 ms and doubles with each retransmission. The retransmission may be limited to 64 times of 500 ms or 32 seconds, see, e.g., IETF RFC 3262 and IETF RFC 3261.

Upon receipt of message 14 by the NG-RAN 207, the NG-RAN 207 initiates either handover if the N26 interface exists (not applicable in the depicted embodiment), or release of access network via inter-system redirection to EPS if the N26 interface does not exist (see block 341). In both cases it is assumed that the UE is a dual mode UE with functionality for both 5GS and EPS. The PGW-C+SMF reports change of the RAT type to PCF/PCRF 221 if these changes are subscribed by PCF/PCRF 221 as specified in clause 4.11.1.2.1, or clause 4.11.1.3.2.6. When the UE is connected to EPS, either Option 1 or Option 2 (described below) is executed.

Option 1: In the case of 5GS to EPS handover (see subclause 4.11.1.2.1 of 3GPP TS 23.502) and in the case of inter-system redirection to EPS with N26 interface (see subclause 4.11.1.3.2 of 3GPP TS 23.502). In either case the UE 205 initiates TAU procedure. Here, it is assumed that the N26 interface is not deployed, therefore Option 1 is not performed.

Option 2: In the case of inter-system redirection to EPS without N26 interface (see subclause 4.11.2.2 of 3GPP TS 23.502). If the UE 205 supports Request Type flag "handover" for PDN connectivity request during the attach procedure (e.g., as described in subclause 5.3.2.1 of 3GPP TS 23.401) and has received the indication that interworking without N26 is supported, then the UE 205 initiates Attach with PDN connectivity request with request type "handover". Here, it is assumed that the N26 interface is not deployed, therefore Option 2 is performed.

At Step 20, at this point the UE 205 and the mobile network (i.e., EPS) have a connection via the E-UTRAN 209. If TCP is used as the transport protocol the SIP "183 Session Progress" request (i.e., received by PGW-U/UPF 219 in step 13) is transmitted towards the UE 205 (see messaging 345). After completion of the mobility procedure to EPS or the 5GS to EPS handover procedure, the E-UTRAN 209 sends the Attach Complete message to the MME 213 (see messaging 347).

At Step 21, upon receipt of the Attach Complete message, the MME 213 sends the modify bearer request to the SGW 215 (see messaging 349).

At Step 22, the SGW 215 sends a modify bearer request to the PGW-C/SMF 217 (see messaging 351).

At Step 23, the PGW-C/SMF 217 re-initiates the setup of the dedicated bearer(s) for the maintained PCC rule(s) and mapping the 5G QoS to EPC QoS parameters (see Diameter Credit-Control Request ("CCR") 353). The PGW-C/SMF 217 reports about successful resource allocation to PCF/PCRF 221. If subscribed by PCF/PCRF 221, the PGW-C/SMF 217 also reports access network information.

At Step 24, the PCF/PCRF 221 acknowledges (see Diameter Credit-Control Answer ("CCA") 355).

At Step 25, the PCF/PCRF 221 reports about successful resource allocation to P-CSCF (AF) 223 (see Diameter Re-Authorization Request (RAR) message 357). If subscribed by the P-CSCF (AF) 223, the PCF-PCRF 221 also reports the access network information, for example, the access type change and/or the IP-CAN type change.

At Step 26, the P-CSCF (AF) 223 acknowledges (see Diameter Re-Authorization Answer (RAA) message 359). At this point the P-CSCF (AF) 223 that has subscribed to the access network information knows that network access is gained back again with a change from the NG-RAN 207 to E-UTRAN 209. If P-CSCF (AF) 223 has received a retransmitted SIP 183 Session Progress request in message 4' (see messaging 337) once the access network is established, the P-CSCF (AF) 223 forwards the SIP 183 Session Progress request towards the UE 205 in message 13' (see messaging 361). The UE 205 and the IMS network will proceed with the remaining of the IMS session establishment procedure (see block 363).

Subclause 18.1.1 in IETF RFC 3261 and 3GPP TS 24.229 introduce a mechanism that responses to a request reuse the same existing TCP connection that is used by the request. However, IETF RFC 3261 does not exclude that the responses are transmitted on a new connection with TCP transport than the request has. If the request has been transmitted with UDP transport, it is not clear that the P-CSCF (AF) 223 will use a UDP connection to send response. The transport protocol of a SIP message may be selected based on, e.g., the size of the SIP message, congestion control and avoiding fragmentation. For instance, a SIP response is usually larger than a SIP request due to the added Record-Route header field values and thereby may be sent by TCP while the SIP request was transmitted by UDP.

Figure 4:
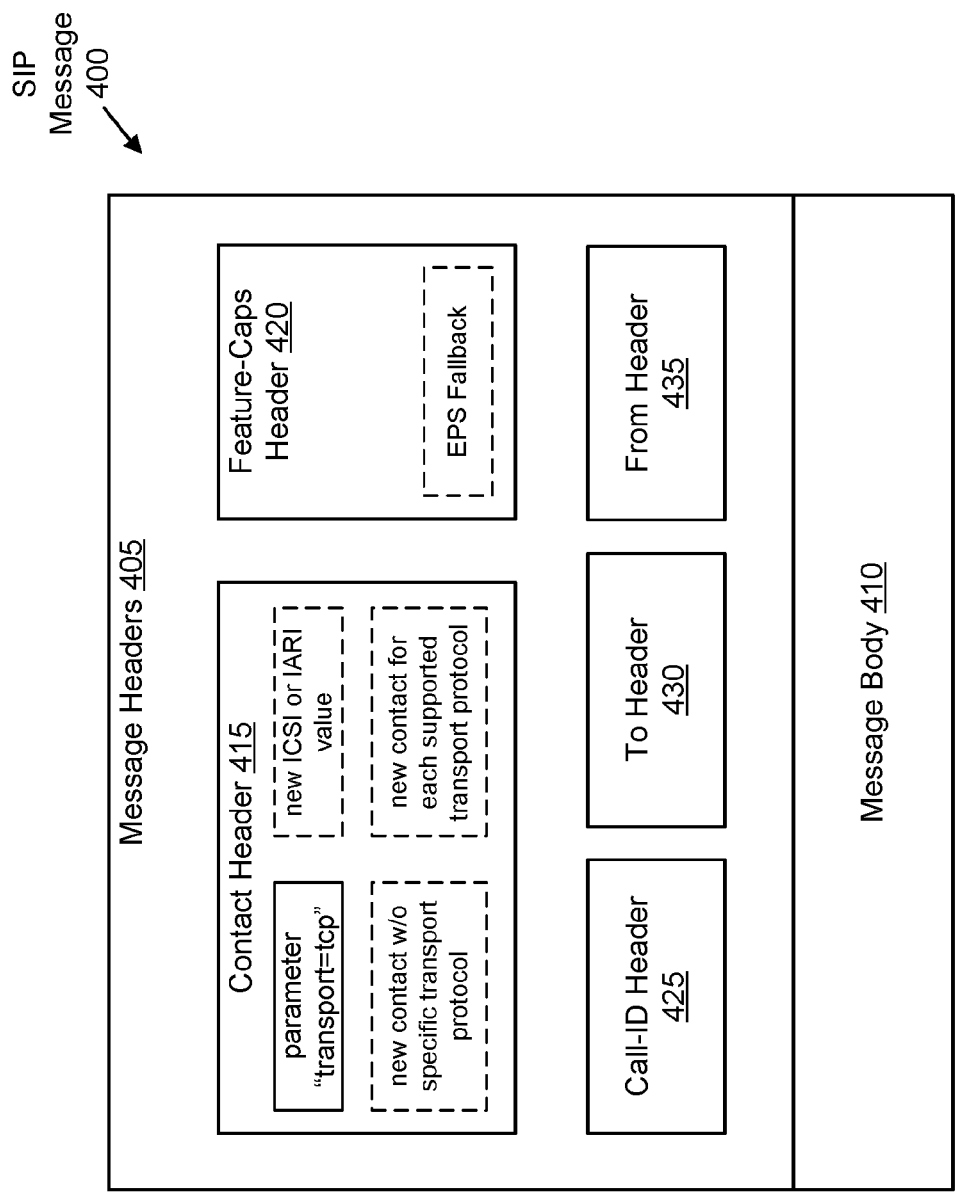
FIG. 4 is a block diagram illustrating one embodiment of a network equipment apparatus that may be used for indicating the IMS capability for EPS fallback.

FIG. 4 depicts an exemplary SIP message 400, according to embodiments of the disclosure. In one embodiment, the SIP message 400 is a SIP REGISTER request used by the remote unit 105 and/or UE 205 to indicate its transport layer preference when registering to an IMS network 160. In another embodiment, the SIP message 400 is a SIP INVITE request used by the remote unit 105 and/or UE 205 to establish a MMTEL session using TCP connection to the P-CSCF 163 and/or P-CSCF (AF) 223. In other embodiments, the SIP message 400 may be another SIP request/response message.

The SIP message 400 includes a plurality of message headers 405 and a message body 410. The SIP message headers 405 include one or more of: a Contact header 415, a Feature-Caps header 420, a Call-ID header 425, a "To" header 430, and a "From" header 435.

By adding the transport TCP in the Contact header field 415 for a particular service such as MMTEL at the time of IMS registration, it may be assumed that the P-CSCF (AF) 223 is "willing" to use the TCP and therefore the P-CSCF (AF) 223 may not be "willing" to do so unless it is enforced as an implementation option for the non-legacy IMS network. The legacy IMS network may still ignore the request by the UE 205 to use the TCP as the transport for sending the SIP messages for the MMTEL service. However, the responses to the request sent by the UE 205 over TCP connection are still mandated to be on the same connection and therefore the UE 205 may enforce the IMS network to respond by using the TCP transport.

If the P-CSCF (AF) 223 has subscribed to the EPS fallback and the access network information, at the time of MMTEL session establishment if the EPS fallback occurs the P-CSCF (AF) 223 knows about the lack of access network and when the access network is re-established. P-CSCF (AF) 223 may therefore forwards the retransmitted SIP 183 Session Progress towards the UE upon re-establishment of the access network as shown in FIGS. 3A-3B. Therefore, TCP as the transport protocol may not be needed in this case. When the TCP transport is not needed, requiring the TCP transport may create complications, such as for the Network Address Translation ("NAT") between the UE 205 and the P-CSCF (AF) 223.

According to this first solution, at the time when the interworking without N26 is supported by the network, if the UE includes a service ICSI such as MMTEL as a URN urn:urn-7:3gpp-service.ims.icsi.mmtel and added it as a tag-value within the media feature tag g.3gpp.icsi-ref in the Contact header field 415 with an extension transport=tcp of the SIP REGISTER request and if the P-CSCF in the IMS network supports subscription to EPS fallback and subscription to the access network information, the IMS network may create at least one new contact for that service.

According to the first solution, the UE may realize from the 5G registration that the network supports the interworking without N26 interface. At the time of IMS registration the UE insert the following in the Contact header field 415 of the SIP REGISTER request.

Contact: <sip:alice@pc33.atlanta.com>; g.3gpp.icsi-ref="urn:urn-7:3gpp-service.ims.icsi.mmtel"; transport=tcp In some embodiments, the IMS network creates a new contact for that service without any specific transport protocol by including in the Contact header field 415 of the SIP 200 OK response to the SIP REGISTER request sent by the UE, the same ICSI e.g. urn:urn-7:3gpp-service.ims.icsi.mmtel and added it as a tag-value within the media feature tag g.3gpp.icsi-ref without any extension for any specific transport protocol.

Accordingly, if the registration is successful and the IMS network acknowledges the registered binding for the address-of-record ("AOR") and also adds a new contact for the same binding however without a specific transport protocol, then the IMS network inserts the following in the SIP 200 OK response to the SIP REGISTER request:

Contact: <sip:alice@pc33.atlanta.com>; g.3gpp.icsi-ref="urn:urn-7:3gpp-service.ims.icsi.mmtel"; transport=tcp Contact: <sip:alice@pc33.atlanta.com>; g.3gpp.icsi-ref="urn:urn-7:3gpp-service.ims.icsi.mmtel Expires=3600

In other embodiments, the IMS network creates new contacts for that service with all the supported transport protocols by including in the Contact header field 415 of the SIP 200 OK response to the SIP REGISTER request sent by the UE, the same ICSI e.g. urn:urn-7:3gpp-service.ims.icsi.mmtel and added it as a tag-value within the media feature tag g.3gpp.icsi-ref and extended with the supported transport protocols.

Accordingly, if the registration is successful and the IMS network acknowledges the registered binding for the AOR and also add a new contact for the same binding however with UDP transport protocol and any other supported transport protocol, then the IMS network inserts the following in the SIP 200 OK response to the SIP REGISTER request:

Contact: <sip:alice@pc33.atlanta.com>; g.3gpp.icsi-ref="urn:urn-7:3gpp-service.ims.icsi.mmtel"; transport=tcp Contact: <sip:alice@pc33.atlanta.com>; g.3gpp.icsi-ref="urn:urn-7:3gpp-service.ims.icsi.mmtel"; transport=udp

. . .

Contact: <sip:alice@pc33.atlanta.com>; g.3gpp.icsi-ref="urn:urn-7:3gpp-service.ims.icsi.mmtel"; transport=Other-transport Expires-3600

In either alternative, upon receipt the SIP 200 OK response with the added new contact in the Contact header field 415, the UE determines that the IMS network support the EPS fallback and therefore, the UE does not need use of TCP transport for the MMTEL session establishment in order not to avoid any loss of SIP signaling due to EPS fallback. Note that the TCP transport may still be used due to other factors, such as the message size and congestion control. However, use of the TCP transport protocol is not mandated to avoid loss of SIP signaling during to EPS fallback.

Note that according to the first solutions, upon registration a legacy UE sees new contacts are already registered on behalf of the UE and may attempt to deregister those contacts or behave differently due to implementations. The legacy UE may not understand the indication by the IMS network with other word. How the legacy UE behaves is due to the UE implementation. However, the IMS network may not to comply with the request for TCP transport by the legacy UE and therefore the terminated SIP signaling for the MMTEL session establishment may use the appropriate transport UDP or TCP or any other protocol without considering the UE's request for TCP transport at the time of IMS registration, as long as those IMS signaling for the MMTEL session establishment are not responses to the requests sent by the UE on TCP transport.

According to the second solution, the Feature-Caps header field 420 in the SIP 200 OK response to the UE's SIP REGISTER request to the IMS network may be used by the P-CSCF or S-CSCF or any IMS network entity to include a feature capability indicator as specified in IETF RFC 6809. The feature capacity indicator in the SIP 200 OK response indicates that the IMS network supports EPS fallback. According to the specified ABNF in IETF RFC 6809, the indicator may be encoded as "+g.3gpp.epsfallback" or "+g.3gpp.eps-fallback" or any "+g.3gpp.XXX" where the 'XXX' informs the UE that the EPS fallback is supported by the network.

The UE may realize from the 5G registration that the network supports the interworking without N26 interface. At the time of IMS registration the UE insert the following in the Contact header field 415 of the SIP REGISTER request:
    Contact: <sip:alice@pc33.atlanta.com>; g.3gpp.icsi-ref="urn:urn-7:3gpp-service.ims.icsi.mmtel";
    transport=tcp If the registration is successful and the IMS network acknowledges the registered binding for the address-of-record ("AOR") and also add a new contact for the same binding however without a specific transport protocol, the IMS network inserts the following in the SIP 200 OK response to the SIP REGISTER request:
    Contact: <sip:alice@pc33.atlanta.com>; g.3gpp.icsi-ref="urn:urn-7:3gpp-service.ims.icsi.mmtel";
    transport=tcp
    Expires=3600

The IMS network includes following Feature-Caps header in the SIP 200 OK response:
    feature-cap=g.3gpp.eps-fallback Upon receipt the SIP 200 OK response with the added new feature capability indicator for IMS network support for EPS fallback. in the Feature-Caps header field 420, the UE determines that the IMS network support the EPS fallback and therefore, the UE does not need use of TCP transport for the MMTEL session establishment in order not to avoid any loss of SIP signaling due to EPS fallback. The TCP transport may still be used due to other factors, such as the message size and congestion control.

According to the second solution, the legacy UE upon registration sees Feature-Caps header field 420 in the SIP 200 OK response to the UE's SIP REGISTER request with a new feature capability indicator. The legacy UE may not understand the indication by the IMS network with other word. How the legacy UE behaves is due to the implementation. However, the IMS network may not to comply with the request for TCP transport by the legacy UE and therefore the terminated SIP signaling for the MMTEL session establishment may use the appropriate transport UDP or TCP or any other protocol without considering the UE's request for TCP transport at the time of IMS registration, as long as those IMS signaling for the MMTEL session establishment are not responses to the requests sent by the UE on TCP transport.

According to the third solution, a new ICSI or IARI value may be used as an indicator to the UE that the IMS network supports the EPS fallback and therefore the UE does not need to adopt TCP transport at the time of MMTEL session establishment. The new ICSI or IARI value is added in the Contact header field 415 of the SIP 200 OK response along with all ICSI values and IARI values received in the Contact header field 415 of the SIP REGISTER request. An example for this ICSI or IARI may be 'urn.urn-7:3gpp-service.ims.icsi.epsfallback' and 'urn:urn-7:3gpp-application.ims.iari.epsfallback' or any urn:urn-7:3gpp-service.ims.icsi.XXXX or urn:urn-7:3gpp-application.ims.iari.XXXX,' where 'XXXX' is to refers to capability for EPS fallback by the IMS network.

The UE may realize from the 5G registration that the network supports the interworking without N26 interface. At the time of IMS registration the UE insert the following in the Contact header field 415 of the SIP REGISTER request.
    Contact: <sip:alice@pc33.atlanta.com>; g.3gpp.icsi-ref="urn:urn-7:3gpp-service.ims.icsi.mmtel";
    transport=tcp If the registration is successful and the IMS network acknowledges the registered binding for the address-of-record (AOR) and also add a new contact for the same binding however without a specific transport protocol, the IMS network inserts the following in the SIP 200 OK response to the SIP REGISTER request:
    Contact: <sip:alice@pc33.atlanta.com>; g.3gpp.icsi-ref="urn:urn-7:3gpp-service.ims.icsi.mmtel";
    transport=tcp;
    g.3gpp.icsi-ref="urn:urn-7:3gpp-service.ims.icsi.epsfallback"
    Expires=3600
    Or
    Contact: <sip:alice@pc33.atlanta.com>; g.3gpp.icsi-ref="urn:urn-7:3gpp-service.ims.icsi.mmtel";
    transport=tcp;
    g.3gpp.iari-ref="urn:urn-7:3gpp-application.ims.iari.epsfallback"
    Expires=3600

To indicate that the IMS network support the EPS fallback.

Upon receipt the SIP 200 OK response with the added new ICSI or IARI value for IMS network support for EPS fallback. in the Contact header field 415, the UE determines that the IMS network support the EPS fallback and, therefore, the UE does not need use of TCP transport for the MMTEL session establishment in order not to avoid any loss of SIP signaling due to EPS fallback. Note, however, that the TCP transport may still be used due to other factors, such as the message size and congestion control.

According to a third solution, the legacy UE upon registration sees Contact header field 415 in the SIP 200 OK response to the UE's SIP REGISTER request with a new ICSI or IARI. The legacy UE may not understand the indication by the IMS network with other word. How the legacy UE behaves is due to the implementation. However, the IMS network may not to comply with the request for TCP transport by the legacy UE and therefore the terminated SIP signaling for the MMTEL session establishment may use the appropriate transport UDP or TCP or any other protocol without considering the UE's request for TCP transport at the time of IMS registration, as long as those IMS signaling for the MMTEL session establishment are not responses to the requests sent by the UE on TCP transport.

According to the fourth solution, a new 5GS network feature support information element ("IE") is to indicate that the IMS network supports the EPS fallback and therefore the UE does not need to adopt TCP transport at the time of MMTEL session establishment. The new 5GS network feature support IE is communicated to the UE by the network during the UE NAS registration by the REGISTRATION ACCEPT message, e.g., according to 3GPP TS 24.501. In one embodiment, the new 5GS network feature support IE may be one bit which may be set to "1" if the IMS network support the EPS fallback. Otherwise, this new IE may be set to "0" to indicate lack of IMS network support for the EPS fallback. Note that other bit values may be used to indicate whether the IMS network supports EPS fallback without loss of SIP signaling.

According to a fourth solution, the legacy UE upon NAS registration receives the new IE in the REGISTRATION ACCEPT message; however, it may not understand the new IE and thus may ignore it. How the legacy UE behaves is due to the UE implementation. However, the IMS network may not to comply with the request for TCP transport by the legacy UE and therefore the terminated SIP signaling for the MMTEL session establishment may use the appropriate transport UDP or TCP (or any other transport protocol) without considering the UE's request for TCP transport at the time of IMS registration, as long as those IMS signaling for the MMTEL session establishment are not responses to the requests sent by the UE on TCP transport.

Figure 5:
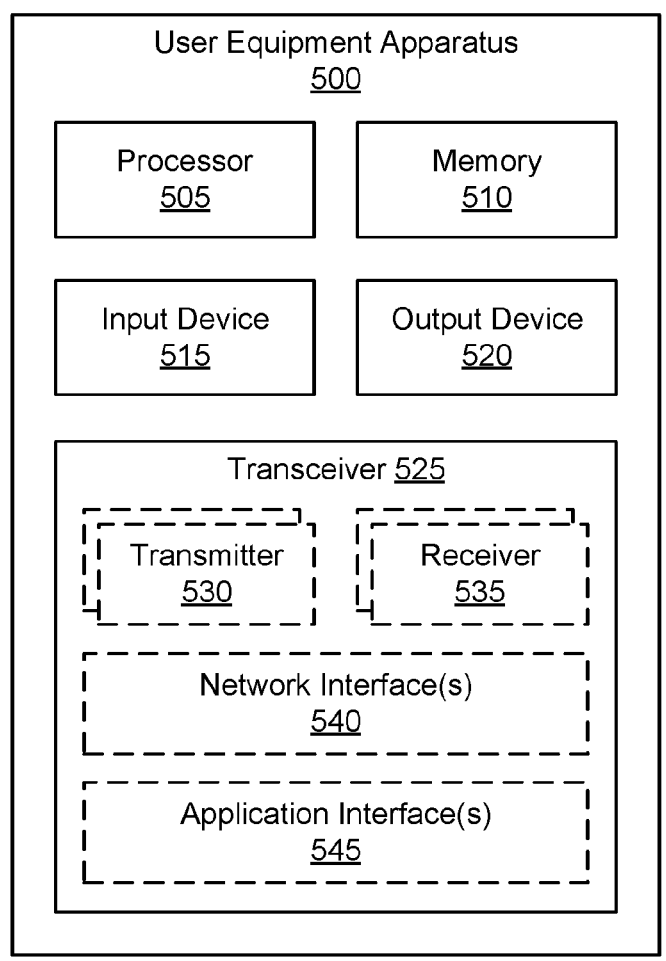
FIG. 5 is a block diagram illustrating one embodiment of a user equipment apparatus that may be used for indicating the IMS capability for EPS fallback.

FIG. 5 depicts a user equipment apparatus 500 that may be used for improved suspension of a data connection, according to embodiments of the disclosure. In various embodiments, the user equipment apparatus 500 is used to implement one or more of the solutions described above. The user equipment apparatus 500 may be one embodiment of the remote unit 105 and/or the UE 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panels supporting one or more beams. Additionally, the transceiver 525 may support at least one network interface 540 and/or application interface 545. The application interface(s) 545 may support one or more APIs. The network interface(s) 540 may support 3GPP reference points, such as Uu, N1, PC5, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. In certain embodiments, the processor 505 may include an application processor (also known as "main processor") which manages application-domain and operating system ("OS") functions and a baseband processor (also known as "baseband radio processor") which manages radio functions.

In various embodiments, the processor 505 controls the transceiver 525 to transmit a first SIP message to an IMS network entity comprising a request for establishing a data session, where the first SIP message contains a first contact header field. The transceiver 525 receives a second SIP message (i.e., indicating successful registration) from the IMS network entity for establishing the data session, where the second SIP message contains an indicator. The processor 505 determines an IMS network capability from a combination of the first contact header field and the indicator.

In some embodiments, the request indicates use of a first transport protocol (e.g., TCP) to maintain a connection during service fallback to a different radio access technology (i.e., fallback from NR/5GC to LTE/EPS). Here, the indicator indicates support of a second transport protocol (e.g., UDP) while maintaining the connection during the service fallback, wherein the second transport protocol is different than the first transport protocol. In certain embodiments, the processor 505 establishes an MM ILL session that supports the first transport protocol and the second transport protocol.

In some embodiments, the first SIP message comprises a 'SIP REGISTER' request and the second SIP message comprises a 'SIP 200 OK' response. In some embodiments, the determined IMS network capability indicates an ability of the IMS network to maintain establishment of the data session at the time of EPS fallback. In one embodiment, the first transport protocol is TCP and the second transport protocol is UDP.

In some embodiments, the second message comprises the first contact header field and a second contact header field establishing the data session, wherein the second contact header to field contains the indicator. In some embodiments, the first contact header field comprises a first extension indicating use of the first transport protocol (e.g., TCP) to maintain a connection during service fallback to a different radio access technology. In certain embodiments, the second contact header field does not include a transport protocol extension (i.e., does not include any extension for a specific transport protocol). In such embodiments, the lack of transport protocol extension indicates support of both the first transport protocol and a second transport protocol (e.g., UDP) different than the first transport protocol. In other embodiments, the second contact header field include a second transport protocol extension indicating use of each supported second transport protocol.

In one embodiment, the indicator comprises a particular ICSI value that indicates support for EPS fallback. In another embodiment, the indicator comprises a particular IARI value that indicates support for EPS fallback. In other embodiments, the second message comprises a feature capabilities field (i.e., Feature-Caps header) which contains the indicator.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to improved suspension of a data connection. For example, the memory 510 may store various parameters, panel/beam configurations, resource assignments, policies, and the like as described above. In certain embodiments, the memory 510 also stores program code and related data, such as an operating system or other controller algorithms operating on the apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
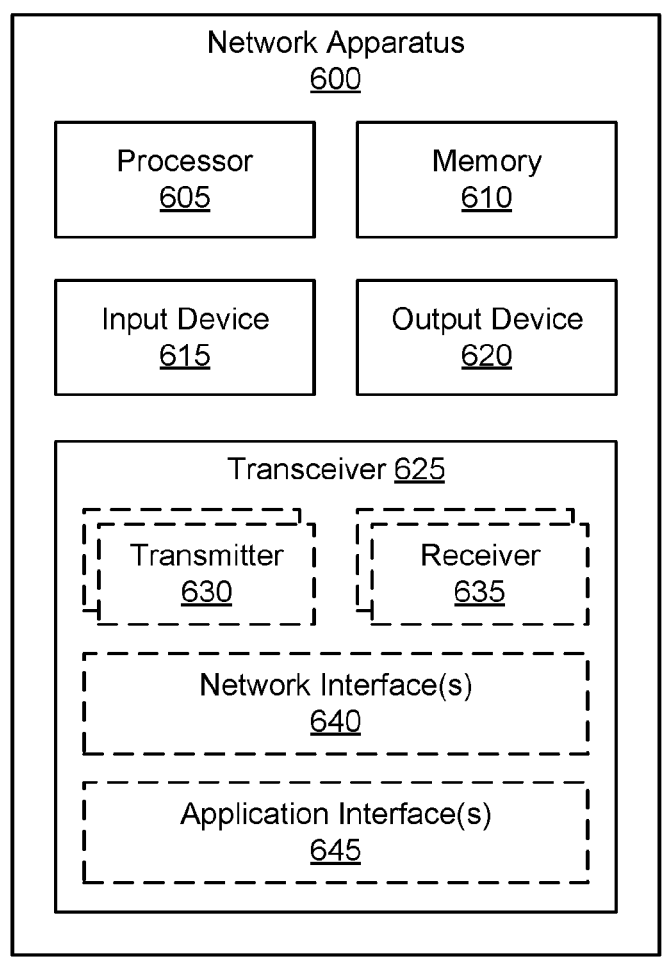
FIG. 6 is a flowchart diagram illustrating one embodiment of a method for indicating the IMS capability for EPS fallback.

FIG. 6 depicts a network apparatus 600 that may be used for improved suspension of a data connection, according to embodiments of the disclosure. In one embodiment, network apparatus 600 may be one implementation of a RAN node, such as the base unit 121 and/or the RAN node 210, as described above. Furthermore, the base network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus

600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network apparatus 600 is a RAN node (e.g., gNB) that communicates with one or more UEs, as described herein. In such embodiments, the processor 605 controls the network apparatus 600 to perform the above described RAN behaviors. When operating as a RAN node, the processor 605 may include an application processor (also known as "main processor") which manages application-domain and operating system ("OS") functions and a baseband processor (also known as "baseband radio processor") which manages radio functions.

In various embodiments, the processor 605 controls network apparatus 600 to perform the IMS network behaviors described herein. In some embodiments, the transceiver 625 receives a first SIP message to a UE comprising a request for establishing a data session, where the first SIP message contains a first contact header field. The processor 605 controls the transceiver 625 to transmit a second SIP message (i.e., indicating successful registration) to the UE for establishing the data session, where the second SIP message contains an indicator. Here, the second SIP message indicates an IMS network capability using a combination of the first contact header field and the indicator.

In some embodiments, the request indicates use of a first transport protocol (e.g., TCP) to maintain a connection during service fallback to a different radio access technology (i.e., fallback from NR/5GC to LTE/EPS). Here, the indicator indicates support of a second transport protocol (e.g., UDP) while maintaining the connection during the service fallback, wherein the second transport protocol is different than the first transport protocol. In certain embodiments, the processor 605 establishes an MM ILL session that supports the first transport protocol and the second transport protocol.

In some embodiments, the first SIP message comprises a 'SIP REGISTER' request and the second SIP message comprises a 'SIP 200 OK' response. In some embodiments, the determined IMS network capability indicates an ability of the IMS network to maintain establishment of the data session at the time of EPS fallback. In one embodiment, the first transport protocol is TCP and the second transport protocol is UDP.

In some embodiments, the second message comprises the first contact header field and a second contact header field establishing the data session, wherein the second contact header field contains the indicator. In some embodiments, the first contact header field comprises a first extension indicating use of the first transport protocol (e.g., TCP) to maintain a connection during service fallback to a different radio access technology. In certain embodiments, the second contact header field does not include a transport protocol extension (i.e., does not include any extension for a specific transport protocol). In such embodiments, the lack of transport protocol extension indicates support of both the first transport protocol and a second transport protocol (e.g., UDP) different than the first transport protocol. In other embodiments, the second contact header field include a second transport protocol extension indicating use of each supported second transport protocol.

In one embodiment, the indicator comprises a particular ICSI value that indicates support for EPS fallback. In another embodiment, the indicator comprises a particular IARI value that indicates support for EPS fallback. In other embodiments, the second message comprises a feature capabilities field (i.e., Feature-Caps header) which contains the indicator.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to improved suspension of a data connection. For example, the memory 610 may store parameters, configurations, resource assignments, policies, and the like, as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the PLMN and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

Figure 7:
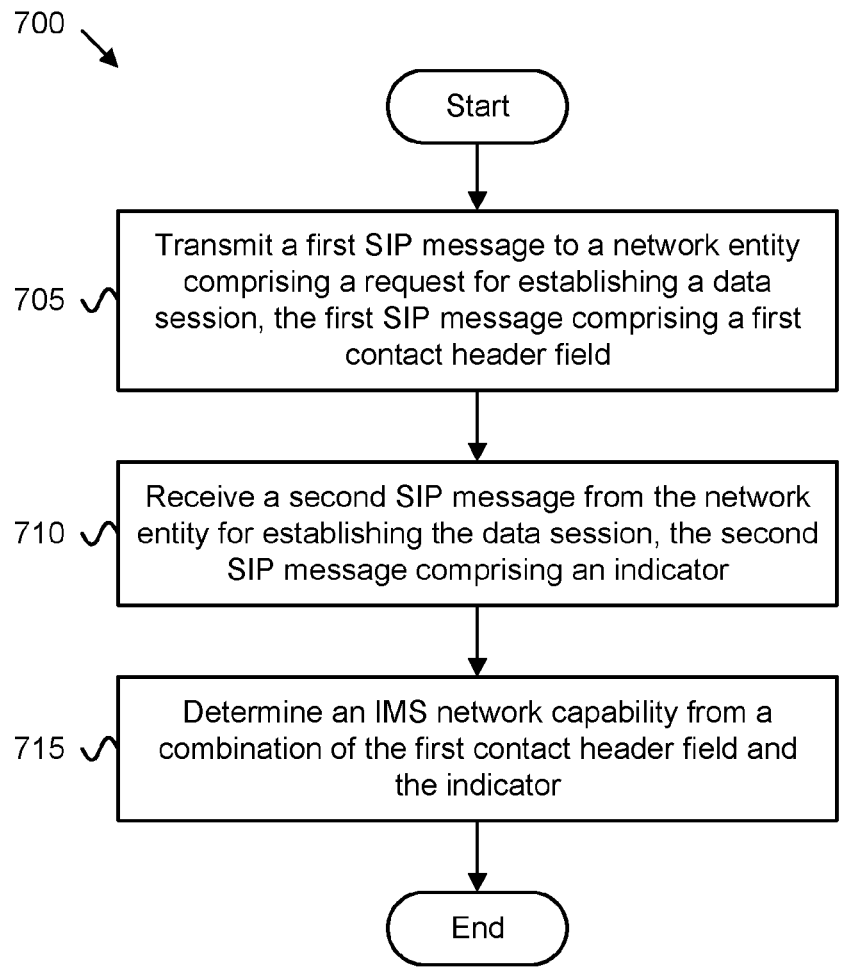
FIG. 7 is a flowchart diagram illustrating another embodiment of a method for indicating the IMS capability for EPS fallback.

FIG. 7 depicts one embodiment of a method 700 for indicating the IMS capability for EPS fallback, according to embodiments of the disclosure. In various embodiments, the method 700 is performed by a user equipment device in a mobile communication network, such as the remote unit 105, the UE 205, and/or the user equipment apparatus 500, described above. In some embodiments, the method 700 is performed by a processor, such as a microcontroller, a microprocessor, a CPU, a GPU, an auxiliary processing unit, a FPGA, or the like.

The method 700 begins and transmits 705 a first SIP message to a network entity comprising a request for establishing a data session, the first SIP message comprising a first contact header field. The method 700 includes receiving a second SIP message (i.e., indicating successful registration) from the network entity for establishing the data session, the second SIP message comprising an indicator. The method 700 includes determining an IMS network capability from a combination of the first contact header field and the indicator. The method 700 ends.

Figure 8:
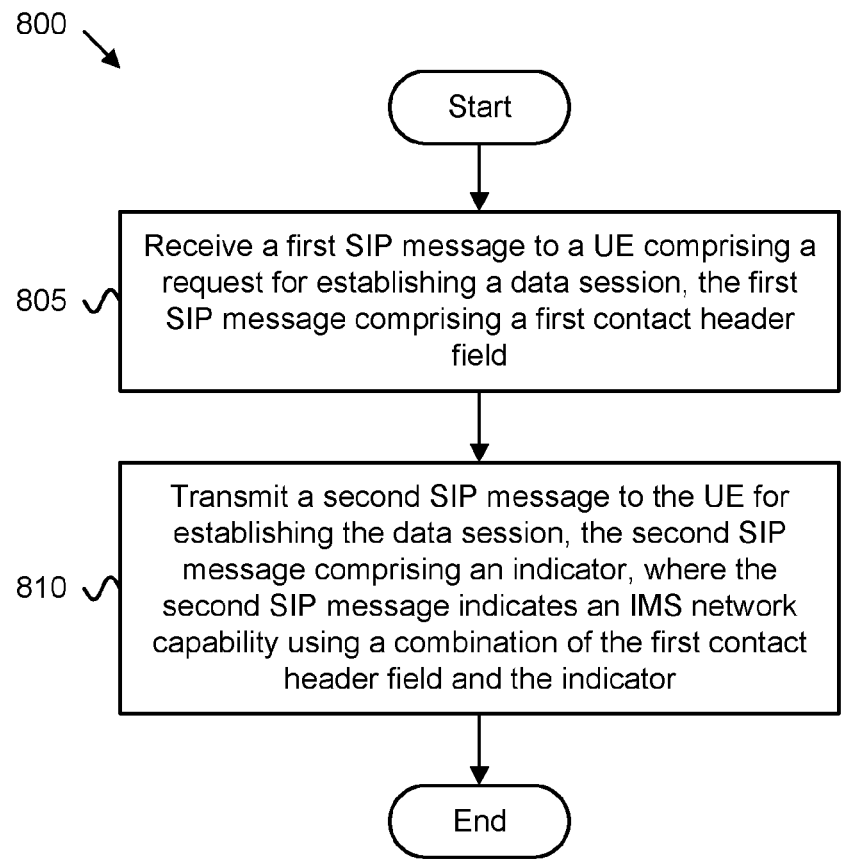
FIG. 8 is a flowchart diagram illustrating a third embodiment of a method for indicating the IMS capability for EPS fallback.

FIG. 8 depicts one embodiment of a method 800 for indicating the IMS capability for EPS fallback, according to embodiments of the disclosure. In various embodiments, the method 800 is performed by an IMS entity in a mobile communication network, such as the P-CSCF 161, the P-CSCF (AF) 223, and/or the network apparatus 600, described above. In some embodiments, the method 800 is performed by a processor, such as a microcontroller, a microprocessor, a CPU, a GPU, an auxiliary processing unit, a FPGA, or the like.

The method 800 begins and receives 805 a first SIP message to a UE comprising a request for establishing a data session, the first SIP message comprising a first contact header field. The method 800 includes transmitting 810 a second SIP message to the UE for establishing the data session, the second SIP message comprising an indicator, where the second SIP message indicates an IMS network capability using a combination of the first contact header field and the indicator. The method 800 ends.

Disclosed herein is a first apparatus for indicating the IMS capability for EPS fallback, according to embodiments of the disclosure. The first apparatus may be implemented by a user equipment device in a mobile communication network, such as the remote unit 105, the UE 205, and/or the user equipment apparatus 500, described above. The first apparatus includes a processor and a transceiver that transmits a first SIP message to an IMS network entity comprising a request for establishing a data session, where the first SIP message contains a first contact header field. The transceiver receives a second SIP message (i.e., indicating successful registration) from the IMS network entity for establishing the data session, where the second SIP message contains an indicator. The processor determines an IMS network capability from a combination of the first contact header field and the indicator.

In some embodiments, the request indicates use of a first transport protocol (e.g., TCP) to maintain a connection during service fallback to a different radio access technology (i.e., fallback from NR/5GC to LTE/EPS). Here, the indicator indicates support of a second transport protocol (e.g., UDP) while maintaining the connection during the service fallback, wherein the second transport protocol is different than the first transport protocol. In certain embodiments, the processor establishes an MMTEL session that supports the first transport protocol and the second transport protocol.

In some embodiments, the first SIP message comprises a 'SIP REGISTER' request and the second SIP message comprises a 'SIP 200 OK' response. In some embodiments, the determined IMS network capability indicates an ability of the IMS network to maintain establishment of the data session at the time of EPS fallback. In one embodiment, the first transport protocol is TCP and the second transport protocol is UDP.

In some embodiments, the second message comprises the first contact header field and a second contact header field establishing the data session, wherein the second contact header field contains the indicator. In some embodiments, the first contact header field comprises a first extension indicating use of the first transport protocol (e.g., TCP) to maintain a connection during service fallback to a different radio access technology. In certain embodiments, the second contact header field does not include a transport protocol extension (i.e., does not include any extension for a specific transport protocol). In such embodiments, the lack of transport protocol extension indicates support of both the first transport protocol and a second transport protocol (e.g., UDP) different than the first transport protocol. In other embodiments, the second contact header field include a second transport protocol extension indicating use of each supported second transport protocol.

In one embodiment, the indicator comprises a particular ICSI value that indicates support for EPS fallback. In another embodiment, the indicator comprises a particular IARI value that indicates support for EPS fallback. In other embodiments, the second message comprises a feature capabilities field (i.e., Feature-Caps header) which contains the indicator.

Disclosed herein is a first method for indicating the IMS capability for EPS fallback, according to embodiments of the disclosure. The first method may be performed by a user equipment device in a mobile communication network, such as the remote unit 105, the UE 205, and/or the user equipment apparatus 500, described above. The first method includes transmitting a first SIP message to an IMS network entity comprising a request for establishing a data session, where the first SIP message contains a first contact header field. The first method includes receiving a second SIP message (i.e., indicating successful registration) from the network entity for establishing the data session, where the second SIP message contains an indicator. The first method includes determining an IMS network capability from a combination of the first contact header field and the indicator.

In some embodiments, the request indicates use of a first transport protocol (e.g., TCP) to maintain a connection during service fallback to a different radio access technology (i.e., fallback from NR/5GC to LTE/EPS). Here, the indicator indicates support of a second transport protocol (e.g., UDP) while maintaining the connection during the service fallback, wherein the second transport protocol is different than the first transport protocol. In certain embodiments, the first method further includes establishing an MMTEL session that supports the first transport protocol and the second transport protocol.

In some embodiments, the first SIP message comprises a 'SIP REGISTER' request and the second SIP message comprises a 'SIP 200 OK' response. In some embodiments, the determined IMS network capability indicates an ability of the IMS network to maintain establishment of the data session at the time of EPS fallback. In one embodiment, the first transport protocol is TCP and the second transport protocol is UDP.

In some embodiments, the second message comprises the first contact header field and a second contact header field establishing the data session, wherein the second contact header field contains the indicator. In some embodiments, the first contact header field comprises a first extension indicating use of the first transport protocol (e.g., TCP) to maintain a connection during service fallback to a different radio access technology. In certain embodiments, the second contact header field does not include a transport protocol extension (i.e., does not include any extension for a specific transport protocol). In such embodiments, the lack of transport protocol extension indicates support of both the first transport protocol and a second transport protocol (e.g., UDP) different than the first transport protocol. In other embodiments, the second contact header field include a second transport protocol extension indicating use of each supported second transport protocol.

In one embodiment, the indicator comprises a particular ICSI value that indicates support for EPS fallback. In another embodiment, the indicator comprises a particular IARI value that indicates support for EPS fallback. In other embodiments, the second message comprises a feature capabilities field (i.e., Feature-Caps header) which contains the indicator.

Disclosed herein is a second apparatus for indicating the IMS capability for EPS fallback, according to embodiments of the disclosure. The second apparatus may be implemented by an IMS entity in a mobile communication network, such as the P-CSCF 161, the P-CSCF (AF) 223, and/or the network apparatus 600, described above. The second apparatus includes a processor and a transceiver that receives a first session initiation protocol ("SIP") message to a remote unit (i.e., UE) comprising a request for establishing a data session, where the first SIP message contains a first contact header field. The processor controls the transceiver to transmit a second SIP message (i.e., indicating successful registration) to the remote unit for establishing the data session, where the second SIP message contains an indicator. Here, the second SIP message indicates an IMS network capability using a combination of the first contact header field and the indicator.

In some embodiments, the request indicates use of a first transport protocol (e.g., TCP) to maintain a connection during service fallback to a different radio access technology (i.e., to fallback from NR/5GC to LTE/EPS). Here, the indicator indicates support of a second transport protocol (e.g., UDP) while maintaining the connection during the service fallback, wherein the second transport protocol is different than the first transport protocol. In certain embodiments, the processor establishes an MMTEL session that supports the first transport protocol and the second transport protocol.

In some embodiments, the first SIP message comprises a 'SIP REGISTER' request and the second SIP message comprises a 'SIP 200 OK' response. In some embodiments, the determined IMS network capability indicates an ability of the IMS network to maintain establishment of the data session at the time of EPS fallback. In one embodiment, the first transport protocol is TCP and the second transport protocol is UDP.

In some embodiments, the second message comprises the first contact header field and a second contact header field establishing the data session, wherein the second contact header field contains the indicator. In some embodiments, the first contact header field comprises a first extension indicating use of the first transport protocol (e.g., TCP) to maintain a connection during service fallback to a different radio access technology. In certain embodiments, the second contact header field does not include a transport protocol extension (i.e., does not include any extension for a specific transport protocol). In such embodiments, the lack of transport protocol extension indicates support of both the first transport protocol and a second transport protocol (e.g., UDP) different than the first transport protocol. In other embodiments, the second contact header field include a second transport protocol extension indicating use of each supported second transport protocol.

In one embodiment, the indicator comprises a particular ICSI value that indicates support for EPS fallback. In another embodiment, the indicator comprises a particular IARI value that indicates support for EPS fallback. In other embodiments, the second message comprises a feature capabilities field (i.e., Feature-Caps header) which contains the indicator.

Disclosed herein is a second method for indicating the IMS capability for EPS fallback, according to embodiments of the disclosure. The second method may be performed by an IMS entity in a mobile communication network, such as the P-CSCF 161, the P-CSCF (AF) 223, and/or the network apparatus 600, described above. The second method includes receiving a first SIP message to a remote unit (i.e., a UE) comprising a request for establishing a data session, where the first SIP message contains a first contact header field. The second method includes transmitting a second SIP message (i.e., indicating successful registration) to the remote unit for establishing the data session, where the second SIP message contains the first contact header field and an indicator. Here, the second SIP message indicates an IMS network capability using a combination of the first contact header field and the indicator.

In some embodiments, the request indicates use of a first transport protocol (e.g., TCP) to maintain a connection during service fallback to a different radio access technology (i.e., fallback from NR/5GC to LTE/EPS). Here, the indicator indicates support of a second transport protocol (e.g., UDP) while maintaining the connection during the service fallback, wherein the second transport protocol is different than the first transport protocol. In certain embodiments, the second method further includes establishing an MMTEL session that supports the first transport protocol and the second transport protocol.

In some embodiments, the first SIP message comprises a 'SIP REGISTER' request and the second SIP message comprises a 'SIP 200 OK' response. In some embodiments, the determined IMS network capability indicates an ability of the IMS network to maintain establishment of the data session at the time of EPS fallback. In one embodiment, the first transport protocol is TCP and the second transport protocol is UDP.

In some embodiments, the second message comprises the first contact header field and a second contact header field establishing the data session, wherein the second contact header field contains the indicator. In some embodiments, the first contact header field comprises a first extension indicating use of the first transport protocol (e.g., TCP) to maintain a connection during service fallback to a different radio access technology. In certain embodiments, the second contact header field does not include a transport protocol extension (i.e., does not include any extension for a specific transport protocol). In such embodiments, the lack of transport protocol extension indicates support of both the first transport protocol and a second transport protocol (e.g., UDP) different than the first transport protocol. In other embodiments, the second contact header field include a second transport protocol extension indicating use of each supported second transport protocol.

In one embodiment, the indicator comprises a particular ICSI value that indicates support for EPS fallback. In another embodiment, the indicator comprises a particular IARI value that indicates support for EPS fallback. In other embodiments, the second message comprises a feature capabilities field (i.e., Feature-Caps header) which contains the indicator.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A User Equipment ("UE"), comprising:
at least one memory; and
at least one processor coupled with the at least one memory and configured to cause the UE to:
transmit a first session initiation protocol ("SIP") message to a network entity comprising a request for establishing a data session and a first contact header field;
receive a second SIP message from the network entity for establishing the data session, the second SIP message comprising an indicator; and
determine an IP Multimedia System ("IMS") network capability from a combination of the first contact header field and the indicator, wherein the indicator comprises a particular value that indicates support for Evolved Packet System ("EPS") fallback, wherein the particular value is an IMS communication service identifier ("ICSI") value or an IMS application reference identifier ("IARI") value.

2. The UE of claim 1, wherein the request indicates use of a first transport protocol to maintain a connection during service fallback to a different radio access technology, wherein the indicator indicates support of a second transport protocol while maintaining the connection during the service fallback, and wherein the second transport protocol is different than the first transport protocol.

3. The UE of claim 2, wherein the at least one processor establishes a multimedia telephony ("MMTEL") session that supports the first transport protocol and the second transport protocol, wherein the first transport protocol is transmission control protocol ("TCP"), and wherein the second transport protocol is user datagram protocol ("UDP").

4. The UE of claim 1, wherein the first SIP message comprises a 'SIP REGISTER' request and the second SIP message comprises a 'SIP 200 OK' response.

5. The UE of claim 1, wherein the determined IMS network capability indicates an ability of the IMS network to maintain establishment of the data session at a time of Evolved Packet System ("EPS") fallback.

6. The UE of claim 1, wherein the second SIP message comprises the first contact header field and a second contact header field establishing the data session, and wherein the second contact header field contains the indicator.

7. The UE of claim 6, wherein the first contact header field comprises a first extension indicating use of a first transport protocol to maintain a connection during service fallback to a different radio access technology, wherein the second contact header field does not include a transport protocol extension, and wherein a lack of transport protocol extension indicates support of both the first transport protocol and a second transport protocol different than the first transport protocol.

8. The UE of claim 1, wherein the second SIP message comprises a feature capabilities field which contains the indicator.

9. A method performed by a User Equipment ("UE") device, the method comprising:
transmitting a first session initiation protocol ("SIP") message to a network entity comprising a request for establishing a data session, the first SIP message comprising a first contact header field;
receiving a second SIP message from the network entity for establishing the data session, the second SIP message comprising an indicator; and
determining an IP Multimedia System ("IMS") network capability from a combination of the first contact header field and the indicator, wherein the indicator comprises a particular value that indicates support for Evolved Packet System ("EPS") fallback, wherein the particular value is an IMS communication service identifier ("ICSI") value or an IMS application reference identifier ("IARI") value.

10. An apparatus in an Internet Protocol Multimedia Subsystem ("IMS") network, the apparatus comprising:
at least one memory; and
at least one processor coupled with the at least one memory and configured to cause the apparatus to:
receive, from a user equipment ("UE"), a first session initiation protocol ("SIP") message comprising a request for establishing a data session and a first contact header field; and
transmit a second SIP message to the UE for establishing the data session, the second SIP message comprising an indicator,
wherein the second SIP message indicates an IMS network capability using a combination of the first contact header field and the indicator, and
wherein the indicator comprises a particular value that indicates support for Evolved Packet System ("EPS") fallback, wherein the particular value is an IMS communication service identifier ("ICSI") value or an IMS application reference identifier ("IARI") value.

11. The apparatus of claim 10, wherein the request indicates use of a first transport protocol to maintain a connection during service fallback to a different radio access technology, wherein the indicator indicates support of a second transport protocol while maintaining the connection during the service fallback, and wherein the second transport protocol is different than the first transport protocol.

12. The apparatus of claim 11, wherein the at least one processor establishes a multimedia telephony ("MMTEL") session that supports the first transport protocol and the second transport protocol, wherein the first transport protocol is transmission control protocol ("TCP"), and wherein the second transport protocol is user datagram protocol ("UDP").

13. The apparatus of claim 10, wherein the first SIP message comprises a 'SIP REGISTER' request and the second SIP message comprises a 'SIP 200 OK' response.

14. The apparatus of claim 10, wherein the IMS network capability indicates an ability of the IMS network to maintain establishment of the data session at a time of Evolved Packet System ("EPS") fallback.

15. The apparatus of claim 10, wherein the second SIP message comprises the first contact header field and a second contact header field establishing the data session, and wherein the second contact header field contains the indicator.

16. The apparatus of claim 15, wherein the first contact header field comprises a first extension indicating use of a first transport protocol to maintain a connection during service fallback to a different radio access technology, wherein the second contact header field does not include a transport protocol extension, and wherein a lack of transport protocol extension indicates support of both the first transport protocol and a second transport protocol different than the first transport protocol.

17. The apparatus of claim 10, wherein the second SIP message comprises a feature capabilities field which contains the indicator.

18. The apparatus of claim 10, wherein the apparatus comprises a proxy-call session control function ("P-CSCF") in the IMS network.

* * * * *